UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 724,235, dated March 31, 1903.

Application filed August 4, 1902. Serial No. 118,389. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification and pointed out in the claims.

The composition in the present instance consists of an intimate mixture of precipitated zinc hydrate (or oxid) and barium sulfate, preferably in molecular proportions, and while a compound precipitate of zinc hydrate and barium sulfate is not new the process, so far as I am aware, is novel. Broadly stated, the process contemplates the successive precipitation of zinc hydrate and barium sulfate from solutions of zinc sulfate and soluble barium salts, notably the sulfid, (chlorid, acetate, or nitrate,) the zinc hydrate being first precipitated by means of a hydrate of one of the alkali metals, preferably sodium hydrate.

As an illustration of the general principle here enunciated I prepare one molecular equivalent of an aqueous solution of zinc sulfate, to which I add two equivalents of sodium hydrate. The result of the mixture is a precipitate of one molecular equivalent of zinc hydrate and one equivalent of sodium sulfate. To the latter solution, after being drained from the precipitate, I add a solution of one equivalent of barium sulfid, which precipitates one equivalent of barium sulfate, leaving a solution of one equivalent of sodium sulfid. This condition may be expressed by the following reactions:

$$ZnSO_4 + 2Na(OH) = Zn(OH)_2 + Na_2SO_4;$$
$$Na_2SO_4 + BaS = BaSO_4 + Na_2S.$$

The sodium sulfid remaining in solution is separated from the precipitate of barium sulfate and can be recovered by any suitable means of evaporation to a crystalline condition. The precipitates are then thoroughly mixed by any suitable means of stirring or agitation, washed, and the superfluous water drained or filter-pressed away. Should it be desirable for any purpose to calcine the mixture and thus convert the zinc hydrate to a zinc oxid, (ZnO,) this may be done by any of the means known to the art. The zinc-hydrate constituent of course imparts body and opacity to the pigment when ground in oil, the barium sulfate being more transparent and having less body, and should it be desirable to increase the proportion of barium sulfate over the molecular relation contained in the foregoing reactions this may be accomplished by adding a second equivalent of alkali sulfate to the corresponding sulfate remaining in solution after the precipitation of the initial zinc hydrate according to the following reactions:

$$ZnSO_4 + 2Na(OH) = Zn(OH)_2 + Na_2SO_4.$$

Adding one equivalent of $Na_2SO_4$ we have $$2Na_2SO_4 + 2BaS = 2BaSO_4 + 2Na_2S,$$

the amount of barium sulfid added being sufficient to completely react on the two molecules of sodium sulfate. For practical reasons the sulfate added is the same as that remaining in solution after the initial precipitation of the zinc hydrate, and in the example just cited sodium sulfate is added to the sodium-sulfate solution resulting from the precipitation of the zinc hydrate. Where potassium hydrate or ammonium hydrate is used to precipitate the zinc, of course the additional salt would be the sulfate of these respective bases.

While barium sulfid is the preferred reagent under my present process, the nitrate, acetate, or chlorid would be a full equivalent thereof, as apparent from the following reactions:

$$ZnSO_4 + 2NaOH + BaCl_2 = BaSO_4 + Zn(OH)_2 + 2NaCl,$$

or $$ZnSO_4 + 2NaOH + Ba(C_2H_3O_2)_2 = Zn(OH)_2 + BaSO_4 + 2NaC_2H_3O_2,$$

or, again, $$ZnSO_4 + 2NaOH + Na_2SO_4 + 2Ba(C_2H_3O_2)_2 = Zn(OH)_2 + 2BaSO_4 + 4NaC_2H_3O_2.$$

From the foregoing it will be seen that where the sulfid of barium is employed as a reagent it is not added until after the precipitation of the zinc hydrate is effected, for were the addition made simultaneously with the zinc sulfate and sodium hydrate there would be danger of the zinc precipitating as the sulfid, leaving the alkali hydrate unaffected, as will appear from the following reaction, thus:

$$ZnSO_4 + 2Na(OH) + BaS = ZnS + BaSO_4 + 2Na(OH).$$

This results, of course, from the great affinity between the sulfur and zinc. Where, however, other salts of barium are used, they may be added together with the zinc sulfate and alkali hydrate, as apparent from the reactions above.

Referring back to the first reaction above given, where zinc sulfate, sodium hydrate, and barium sulfid are the reagents, it must be borne in mind that unless the precise molecular equivalents of these reagents are used there is danger of precipitating zinc sulfid along with the hydrate, and this for two reasons. First, the zinc hydrate precipitated is partially redissolved in the sodium hydrate if the latter be in excess, and when the barium sulfid is added the zinc so dissolved will be precipitated as a sulfid. It is for this reason, therefore, as above stated, that the sodium-sulfate solution is drained into a separate container, where the zinc so dissolved can be removed by precipitation as a sulfid by the careful addition of sodium sulfid, thus:

$$Zn(OH)_2 + Na_2S = ZnS + 2Na(OH),$$

which precipitate can then be removed from the solution, leaving the latter chemically pure for reaction upon the barium sulfid to be subsequently added. To avoid the danger of any portion of the zinc hydrate from being dissolved by the excess of sodium hydrate, it is better in practice to have the zinc sulfate in excess, (such excess constituting the second reason for the danger aforesaid,) which excess can be removed by precipitating the zinc in the form of sulfid by the addition of sodium sulfid to the sodium-sulfate solution remaining after the zinc precipitation, thus:

$$Na_2SO_4 + ZnSO_4 + Na_2S = Na_2SO_4 + ZnS + Na_2SO_4,$$

when the slight precipitate of zinc sulfid can be removed from the solution as before and before the addition of the barium sulfid thereto. Of course the presence of the almost imperceptible amount of sodium hydrate in the first of the above examples will in no wise interfere with the free precipitation of the barium sulfate upon the addition of the barium sulfid to the sodium-sulfate solution containing said hydrate.

Where, as previously stated, it is desirable to have a pigment in which the barium-sulfate precipitate preponderates over the zinc hydrate, in which instance it is necessary to add a second equivalent of sodium sulfate to produce the said excess of barium precipitate, it frequently happens that such additional equivalent of the sodium-sulfate salt contains as an impurity the sulfate of iron, and it becomes necessary at this juncture to remove the iron before the sulfate salt is added. This may be accomplished in several ways, among them being the following: First, the iron may be precipitated by the addition of the proper amount of sodium sulfid to the sulfate solution, thus:

$$Na_2SO_4 + FeSO_4 + Na_2S = FeS + Na_2SO_4 + Na_2SO_4;$$

second, by the addition of the hydrate of an alkaline earth, such as calcium hydrate, thus:

$$Na_2SO_4 + FeSO_4 + Ca(OH)_2 = Fe(OH)_2 + CaSO_4 + Na_2SO_4,$$

the iron being precipitated as the hydrate; or, third, by the addition of the hydrate of an alkali metal, thus:

$$Na_2SO_4 + FeSO_4 + 2Na(OH) = Fe(OH)_2 + Na_2SO_4 + Na_2SO_4.$$

The object of getting rid of the iron of course is to prevent its precipitation as the sulfid upon the addition of barium sulfid in the main process, the sulfid of iron being an undesirable impurity on account of its brown or black color.

While the possibility always exists of having a small percentage of zinc in the solution of the sulfate of sodium remaining after the precipitation of the zinc hydrate—a percentage which it is essential to get rid of in the manner heretofore indicated before the final addition of the barium sulfid takes place, a percentage whose presence would be of no consequence were any other salt of barium except the sulfid added in the final step of the process—still the barium sulfid is preferred on account of its cheapness, and the zinc remaining in the sodium-sulfate solution (or in the excess of zinc sulfate, where such excess is resorted to) is gotten rid of by means of sodium sulfid, as heretofore explained, and the reason for ridding the final precipitates of this zinc-sulfid impurity is that a white pigment containing zinc sulfid could not safely be mixed with a pigment containing lead, such as the chromate of lead, owing to the powerful affinity of sulfur for lead, for it is well known that compounds of lead and sulfur are black or dark in color, and there would be the danger of discoloring an otherwise beautiful or brilliant yellow. For the same reason a white-lead pigment cannot safely be mixed with the pigments containing sulfur, such as the beautiful blue pigment ultramarine and vermilion. A zinc-hydrate or zinc-oxid pigment, on the other hand, can safely be mixed with any of these pigments, as there is no danger of discoloration.

To insure that the resulting precipitates of zinc hydrate and barium sulfate be free from sulfur, the resulting sodium-sulfid solution resulting at the end of the operation should be rapidly filtered off, so that no sulfid be left behind to react upon the zinc hydrate present.

If it is desired to produce a pigment in which the zinc hydrate shall molecularly preponderate over the barium sulfate, the same can be accomplished by adding one equivalent of zinc chlorid to the zinc sulfate (thus making two equivalents of zinc-salt) and using four equivalents of sodium hydrate and one equivalent of barium solution—say in the form of chlorid—thus:

$$ZnSO_4 + ZnCl_2 + 4Na(OH) = 2Zn(OH)_2 + Na_2SO_4 + 2NaCl;$$

$$Na_2SO_4 + 2NaCl + BaCl_2 = BaSO_4 + 4NaCl,$$

such a precipitate containing two molecules of zinc hydrate and one molecule of barium sulfate.

It is of course to be understood that I may resort to the doctrine of chemical equivalents wherever the same may be applicable.

Having described my invention, what I claim is—

1. In the manufacture of pigments, the process of adding the hydrate of an alkali metal to a soluble salt of zinc, then adding a salt of barium, and recovering the resulting precipitates, substantially as set forth.

2. In the manufacture of pigments, the process of adding the hydrate of an alkali metal to zinc sulfate, then adding a soluble salt of barium and recovering the resulting precipitates, substantially as set forth.

3. In the manufacture of pigments, the process of adding the hydrate of an alkali metal to zinc sulfate, then adding barium sulfid and recovering the resulting precipitates, substantially as set forth.

4. In the manufacture of pigments, the process of adding the hydrate of sodium to zinc sulfate, then adding a soluble barium salt, and recovering the resulting precipitates, substantially as set forth.

5. In the manufacture of pigments, the process of adding the hydrate of sodium to zinc sulfate, then adding barium sulfid, and recovering the resulting precipitates, substantially as set forth.

6. In the manufacture of pigments, the process of adding a hydrate of an alkali metal to sulfate of zinc, then adding a salt of barium, recovering and mixing the precipitates; and calcining the zinc-hydrate constituent to a zinc oxid, substantially as set forth.

7. In the manufacture of pigments, the process of mixing the hydrate of an alkali metal with a soluble salt of zinc and a soluble salt of barium, and recovering the resulting precipitates, substantially as set forth.

8. In the manufacture of pigments, the process of mixing the hydrate of an alkali metal with zinc sulfate and a soluble salt of barium, and recovering the resulting precipitates, substantially as set forth.

In testimony whereof I affix my signature in presence of two witnesses.

WILLIAM J. ARMBRUSTER.

Witnesses:
EMIL STAREK,
G. L. BELFRY.